March 5, 1974  R. W. STAHR ET AL  3,795,516

BARRIER LAYER FOR LIQUID CRYSTAL-CONTAINING ELEMENTS

Filed Nov. 13, 1972

United States Patent Office 3,795,516
Patented Mar. 5, 1974

3,795,516
BARRIER LAYER FOR LIQUID CRYSTAL-CONTAINING ELEMENTS
Richard W. Stahr and Hans G. Franke, Rochester, N.Y., assignors to Eastman Kodak Company, Rochester, N.Y.
Filed Nov. 13, 1972, Ser. No. 306,231
Int. Cl. G03g 5/00
U.S. Cl. 96—1.5
9 Claims

ABSTRACT OF THE DISCLOSURE

An improved barrier layer containing poly(vinyl alcohol) is disclosed for use in an electrooptical element containing a photoconductive layer, a liquid crystal film, and the barrier layer sandwiched between them.

BACKGROUND OF THE INVENTION

Field of the invention

This invention relates to reproduction elements and systems using such elements which employ juxtaposed layers of photoconductive materials and liquid crystal materials and, in particular, to an improved barrier layer composition which may be used in these elements to extend their useful lifetimes.

Description of the prior art

As described in U.S. Pat. 3,592,527 issued July 13, 1971, it has been found that useful visual display devices can be produced which contain as the visual image-forming element thereof a multilayer structure composed of a layer or film of a liquid crystal material overlying a layer of a photoconductive composition.

The image-forming capability of the above-described liquid crystal photoconductor unit is, of course, due to the electrooptical properties of such a unit. The photoconductive properties of conventional photoconductive materials and layers containing the same are well-known, having been described in numerous patents, literature references and texts, for example, Schaffert, Electrophotography, published by Focal Press Ltd., 1965.

The electrooptical properties of liquid crystalline material, although described in various literature references, are perhaps not so well-known. Briefly, toward the end of the 19th century F. Reinitzer and O. Lehmann independently observed that certain substances in passing from a solid crystalline state to an isotropic liquid state passed through a state or condition over a given temperature range wherein they display rheological properties similar to that of fluids, but have optical properties similar to that of the crystalline state. In order to identify these properties, Lehmann used the term "liquid crystal," which terminology persists today. Present thinking tends to regard substances which exhibit these properties as being in a fourth state of matter known as the mesomorphic state or mesophase, since it is a state or phase intermediate that of the anisotropic crystal and that of the isotropic liquid.

There are three distinct mesophoric states or forms, namely, the smectic mesophase, the nematic mesophase and the cholesteric mesophase. A nematic liquid crystal is essentially transparent and therefore transmits light; but when placed in a D.C. electrical field, the molecules of some of these nematic liquid crystals become disoriented so that the materials diffuses light and becomes milky white in appearance. When the D.C. electric field is removed, the molecules of the nematic liquid crystal return to their previous orientation so that the liquid crystal is again transparent. This phenomenon is discussed in Proceedings of the I.E.E.E. for July 1968, in an article entitled "Dynamic Scattering: A New Electrooptical Effect in Certain Classes of Nematic Liquid Crystals," by Heilmeier, Zanoni and Barton at pages 1162–1171.

The reflective optical storage effect of mixtures of cholesteric and nematic liquid crystal materials is discussed in a papering appearing in Applied Physics Letters for Aug. 15, 1968, in an article entitled "A New Electric Field Controlled Reflective Optical Storage Effect in Mixed-Liquid Crystal Systems," by Heilmeier and Goldmacher at pages 132–133, in which the authors describe how a mixture of nematic and cholesteric mesomorphic materials exhibit optical properties under a D.C. or low-frequency A.C. electric field, which changes the initially transparent material to a milky white, light-diffusing material. The liquid crystal material remains in the light-diffusing state upon removal of the electrical field. The mixture can be readily raised or changed back to a transparent state by the application of a high-frequency A.C. signal greater than 700 Hz.

An investigation of the electrooptical properties of a multilayer structure containing both photoconductive and liquid crystal materials has lead to the finding that a visual image may be formed by projecting a light image upon an element having such a multilayer structure interposed between two transparent electrodes as a voltage pulse is applied across the electrodes. That is, the light image impinging on the photoconductive layer as the voltage pulse is applied across the element causes the exposed areas of the photoconductive layer to become more conductive than the unexposed areas which, in turn, causes imagewise dynamic scattering in the areas of the liquid crystal material corresponding to the conductive portions of the photoconductive layer.

Although a photoconductor-liquid crystal unit has been found useful in various electrooptical devices such as viewing screens, display devices, etc., one problem which has limited the use of such elements in various display devices is the fact that many, if not most, useful photoconductive materials are subject to chemical attack by an adjacent layer of liquid crystal material. Typically, for example, an organic photoconductive film overcoated with a thin film or layer of a liquid crystal material will be rendered substantially useless by the chemical action of the liquid crystal material on the photoconductive substance within a few hours. In the past, various polymeric layers have been interposed between the photoconductive layer and the liquid crystal layer to prevent chemical attack by the liquid crystal material. However, relatively few polymeric layers have been found successful. Typically, this is because the barrier layer is not sufficiently impermeable to the liquid crystal material to prevent chemical attack of a photoconductive layer by a liquid crystal material. However, the barrier layer must not only be impermeable to the liquid crystal material, but in addition, it must have proper electrical characteristics so as not to interfere with the electrical properties of the photoconductive-liquid crystal unit. Illustrative of various barrier layer materials which have been tried in the past are cellulose nitrate barrier layer materials as described in Morse, U.S. patent application Ser. No. 81,959, filed Oct. 19, 1970, now U.S. Pat. No. 3,722,998, and entitled "Method and Apparatus for Contrast Reducing."

Other materials have been interposed between a liquid crystal layer and a photoconductive material in various types of electrooptical imaging processes and devices other than those discussed above. For example, British Pat. 1,235,552 dated June 16, 1971 at page 3 thereof describes the use of an insulating polymeric material interposed between a liquid crystal material and a photoconductive layer. These insulating polymeric materials include cellulose acetates, polyurethanes, polyolefins, polyesters, polystyrene, polycarbonates, and preferably polyvinyl fluoride. However, insulating polymeric materials such as those noted immediately hereinbefore have proven unsatisfactory as a barrier layer in an imaging process or device as described in U.S. Ser. No. 81,959 (noted previously) because of their extremely high resistivity. That is, these materials are so insulating that they interfere with the electrical properties of the photoconductive-liquid crystal element in such processes and devices. In addition, it has been found that when materials such as polyurethanes, cellulose acetates, cellulose nitrates, and polyvinyl fluoride as well as many of the other above-noted polymeric materials are interposed between a photoconductive layer and a liquid crystal layer, the resultant element remains in effective operating condition for only relatively short periods of time due to chemical decay. That is, these materials are subject to being dissolved by or being crystallized by typical liquid crystal compositions. Such chemical decay, of course, results in degradation of the barrier layer by the liquid crystal compositions; and, also, the liquid crystal composition may become contaminated and no longer effectively scatters light when the photoconductor liquid crystal element is activated.

SUMMARY OF THE INVENTION

In accord with the present invention there is provided an electrooptical element comprised of a film of a liquid crystal composition, a layer of a photoconductive insulating composition, and an improved polymeric barrier layer interposed between said liquid crystal composition and said photoconductive composition. The barrier layer utilized in the present invention comprises a polymeric composition consisting essentially of from about 50 to 100 weight percent of poly(vinyl alcohol) and from 0 to about 50 weight percent of a cross-linking agent. In accord with a preferred embodiment of the invention, the barrier layer composition consists essentially of poly(vinyl alcohol) containing no cross-linking agent.

The polymeric barrier layer materials of the present invention have the special advantages that they (1) possess optimum electrical and imaging properties as described hereinafter, (2) effectively withstand solvent and chemical attack by the liquid crystal material, and (3) relatively impermeable to a liquid crystal composition.

Various additional advantages of the present invention will be apparent from the description which follows.

DESCRIPTION OF PREFERRED EMBODIMENTS

Figure 1:
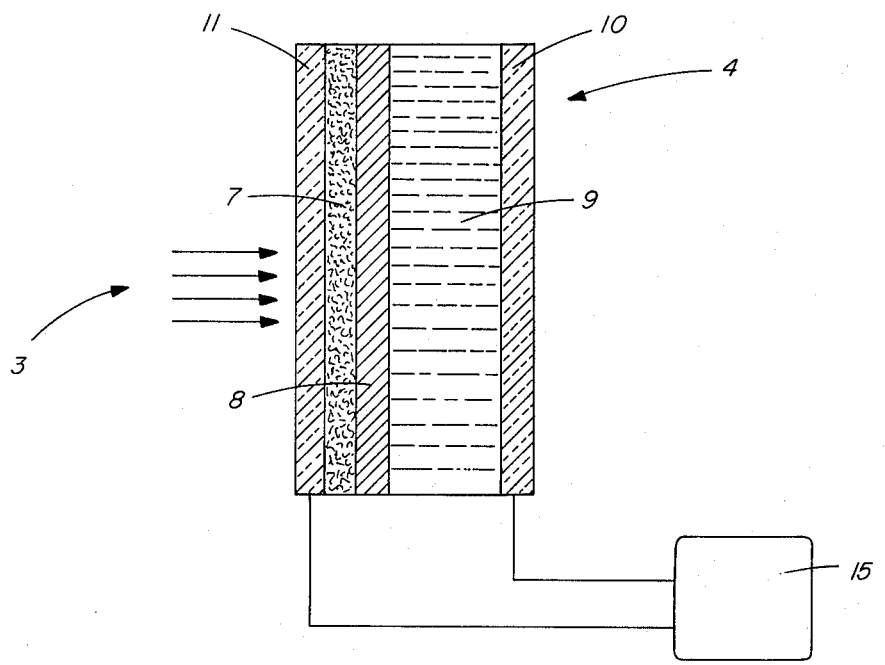
FIG. 1 is a schematic sectional view of an electrooptical display device incorporating the electrooptical element of the invention.

As stated hereinabove, the barrier layer utilized in the present invention is a poly(vinyl alcohol)-containing layer. As is well-known, poly(vinyl alcohol) is typically prepared by the alcoholysis of poly(vinyl acetate). Generally, in accord with the present invention, it has been found that the more fully hydrolyzed (i.e., alcoholyzed) the poly(vinyl acetate), i.e., the greater the percentage conversion of acetate groups to hydroxy groups, the better the resultant barrier layer obtained. Especially good results, therefore, have been obtained utilizing a hydrolyzed poly(vinyl acetate) which is at least 85 percent hydrolyzed and preferably 97 percent or more hydrolyzed. The molecular weight of the poly(vinyl alcohol) may vary considerably. Generally, best results have been obtained with medium and high molecular weight materials, i.e., poly(vinyl alcohol) having a molecular weight greater than about 10,000 up to 130,000 and higher.

In accord with one embodiment of the present invention wherein the barrier layer does not contain a cross-linking agent, it has been found advantageous to utilize a polymeric material consisting essentially of poly(vinyl alcohol). Using these amounts of poly(vinyl alcohol) in the barrier layer, one obtains optimum barrier layer properties including good electrical properties and resistance to chemical attack by the liquid crystal material. In accord with this embodiment of the invention it has been found that best results are generally obtained utilizing a poly(vinyl alcohol) which is prepared from poly(vinyl acetate) which is more than about 97 percent hydrolyzed.

In accord with another embodiment of the invention wherein the polymeric material of the barrier layer consists essentially of poly(vinyl alcohol) and a cross-linking agent, optimum results may be obtained with somewhat smaller amounts of poly(vinyl alcohol) than described above in the first embodiment of the invention. For example, barrier layers containing 50 weight percent poly(vinyl alcohol) and 50 weight percent cross-linking agent have been found to provide good results. Typically, in accord with this embodiment of the invention best results are obtained utilizing a poly(vinyl alcohol) prepared from a poly(vinyl acetate) having a high degree of hydrolyzation (i.e., greater than 97 percent hydrolyzed).

The cross-linking agent employed in certain embodiments of the present invention may be selected from a variety of known materials available for use as a cross-linking agent for poly(vinyl alcohol). Typical crosslinking agents include aldehydes such as glyoxal and formaldehyde; methylolureas and methylolmelamines and derivatives thereof such as methoxymethylmelamine and hexamethoxymethylmelamine; organic titanate complexes such as Tyzor TE and Tyzor LA trademarks of E. I. du Pont Nemours and Co. for a chelate complex of titanium and triethanolamine and a chelate complex of titanium and an ammonium salt of lactic acid, respectively.

Preferably, to ensure that the barrier layer of the invention remains resistant to solvent attack from the liquid crystal composition, the particular cross-linking agent selected should contain a minimal amount of aliphatic or aromatic hydrocarbon groups. In this respect, an especially useful crosslinking agent for use in the present invention is hydrolyzed tetraethyl orthosilicate, sometimes referred to as polysilicic acid.

Hydrolyzed tetraethyl orthosilicate can be prepared by stirring about 2 parts by weight of tetraethyl orthosilicate with about 1 part by weight of 0.1 normal hydrochloric acid. The temperature rises spontaneously to a maximum of about 60° C. within about 5 minutes. Stirring is discontinued and the solution is permitted to stand until used.

The amount of water typically used in the hydrolysis of the ethyl silicate is such that, as the ester progressively hydrolyzes and condenses into a polymer in the presence of suitable solvents, a single solution phase is maintained throughout the process. For example, the amount of water for the hydrolysis of the ethyl silicate can be about 1 part by volume to about 5 parts by volume ethyl silicate but considerably more water may be used. In a preferred embodiment, at least 20 percent by weight of water is used, based on the amount of ethyl silicate. From 20 percent to 100 percent by weight of water based on the amount of ethyl silicate is preferred.

A relatively high concentration of a hydrolysis catalyst is desirable for the hydrolysis of tetraethyl orthosilicate when an efficient common solvent for tetraethyl orthosilicate and the hydrolysis products is not present. This accelerates dissolution and prevents precipitation of silicic acid ($SiO_2 \cdot xH_2O$) due to a high degree of local hydrolysis and polymerization. For this reason, it is convenient to use 0.1 normal hydrochloric acid as the source of both water and catalyst. However, with efficient agitation, 0.01 normal hydrochloric acid may be used and, with an efficient common solvent present, such as ethanol, the reaction proceeds satisfactorily without the use of catalyst. Among the catalysts suitable for this hydrolysis reaction are the mineral acids, such as, hydrochloric, phosphoric, and sulfuric acid, and non-volatile organic acids, such as, oxalic and maleic, or even weaker or more volatile organic acids, such as, acetic and formic acids.

In that embodiment of the present invention wherein the barrier layer contains poly(vinyl alcohol) and a cross-linking agent, for example, hydrolyzed tetraethyl orthosilicate, the cross-linked barrier layer is typically prepared by coating the above-noted alcohol and cross-linking agent on the surface of a photoconductive insulating layer (or optional subbing layer as described hereinafter) and curing the resulting coating. Curing may be effected at room temperature up to about 120° C. The cross-linked barrier layers of the prsent invention are conveniently prepared by admixing together the poly(vinyl alcohol) and cross-linking agent in a single aqueous solution and coating the solution onto the photoconductive insulating layer as a film. The resultant cross-linked barrier layer coating is formed in situ on the photoconductive layer (or optional subbing layer as described hereinafter) by curing the film coating as described above.

When cured, the resulting hydrolyzed tetraethyl orthosilicate cross-linked coatings of the present invention appear to form a 3-dimensional polymer network wherein adjacent substantially linear poly(vinyl alcohol) molecules are chemically bonded together by cross-links formed of a hard, 3-dimensional network or lattice composed of

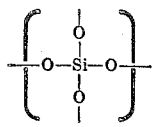

units, i.e. a repeating unit of hydrolyzed tetraethyl orthosilicate or poly(silicic acid). As will be apparent from the above description, the hydrolyzed tetraethyl orthosilicate cross-linked poly(vinyl alcohol) coatings used in the present invention are somewhat different than conventional cross-linked coatings which may be visualized on the molecular level as composed primarily of a 2-dimensional polymer structure wherein adjacent substantially linear polymers are linked together by mono-functional or di-functional cross-link forming moieties.

A further description of the above-described hydrolyzed tetraethyl orthosilicate, if desired, may be found in Bechtold et al., U.S. Pat. 2,404,426, issued July 23, 1946 and Nacci, Canadian Pat. 853,144, issued Oct. 6, 1970.

It may be observed as noted above that cross-linking agents other than the hydrolyzed tetraethyl orthosilicate can be used. However, the resultant barrier layer compositions containing such other cross-linking agents generally do not possess resistance to liquid crystal solvent attack comparable to that provided by the poly(vinyl alcohol)-hydrolyzed tetraethyl orthosilicate compositions described above.

The electrical resistivity properties of the barrier layer compositions of the present invention are important. That is, it has been found that an effective barrier layer interposed between a photoconductive insulating layer and a liquid crystal film advantageously possesses an electrical resistivity intermediate between that of the resistivity of the liquid crystal film and the dark resistivity of the photoconductive composition. For example, for a typical photoconductive-liquid crystal electrooptical element of the type described in Morse, U.S. Ser. No. 81,959 referred to hereinabove, it has been found that conventional liquid crystal materials generally possess an electrical resistivity within the range of from about $10^8$ to about $10^{10}$ ohm-cm. and conventional photoconductive insulating materials typically exhibit a dark resistivity greater than about $10^{15}$ ohm-cm. Accordingly, a useful barrier layer for such an electro-optical element should advantageously possess a resistivity within the range of from greater than about $10^{10}$ to less than about $10^{15}$ ohm-cm. It will be appreciated that the aforementioned resistivity ranges are merely exemplary and may vary somewhat depending on the particular photoconductive insulating material and liquid crystal film. The point to be recognized here is simply that the barrier layer composition preferably has a resistivity intermediate between that of the liquid crystal film and the dark resistivity of the photoconductive insulating composition.

Although useful barrier layers in accord with the present invention may exhibit a resistivity somewhat outside the preferred range noted above, i.e., intermediate between the resistivity of the liquid crystal film and the photoconductive insulating layer, it has been found that if the electrical resistivity of the barrier layer is substantially higher than that specified in the above range, the resultant electro-optical element containing such a barrier layer exhibits very poor electrical response, i.e., it is difficult to obtain a good visual image in the liquid crystal film unless unusally large electrical potentials are applied to the electrooptical element. On the other hand, if the electrical resistivity of the barrier layer is substantially lower than that specified in the above range, the liquid crystal film of the resultant electrooptical element exhibits a fuzzy or unsharp visual image due to non-imagewise dynamic scattering of the liquid crystal film. Such non-imagewise dynamic scatter in the liquid crystal film is caused by the low resistivity of the barrier layer which leads to lateral conductivity within the barrier layer.

The term electrical resistivity as utilized herein is defined as the specific resistivity ($\rho$) of a material as measured at 23° C.

The thickness of the barrier layers utilized in the present invention typically vary within the range from about 0.5 to about 5 microns. However, layers having a thickness outside the above range may also be used.

The barrier layers utilized in the invention may be applied as an overcoat to a photoconductive insulating layer, and then, in turn, overcoated with a liquid crystalline film to provide the electrooptical element of the invention. In addition, if desired, various thin subbing layers serving as adhesion promoting layers may be disposed between the photoconductive layer and the barrier layers. Typically, subbing layers are on the order of about 1 micron thick or less and comprise a polymeric composition such as a blend of poly(acrylic acid) and poly(vinyl acetate). However, as noted above, such subbing layers are optional. These subbing layers are not good barrier layers by themselves because of their inability to withstand solvent attack by conventional liquid crystal materials.

The application of the barrier layer to the photoconductive layer utilized in the present invention may be effected by a variety of techniques including solvent coating such as dip coating, spray coating, and the like; various lamination techniques; dispersion coating techniques, etc. Generally, it has been found that useful barrier layers may be provided by coating a solvent solution of the barrier layer composition onto the surface of a photoconductive layer or subbing layer and drying the resultant wet coating to form a film of the barrier layer composition. Typical solvents which may be used include organic solvents such as methanol, n-butyl alcohol, 2-butanone, ethylacetate, tetrahydrofuran, nitromethane or toluene; inorganic solvents such as water; and mixtures of organic and inorganic solvents, such as aqueous-alcohol solvents.

The liquid crystal film utilized in the present invention may be selected from a variety of useful liquid crystal compositions. If a nematic liquid crystal composition is used the resultant electrooptical element containing the same will provide a visual image display only so long as an electric field is applied and is erased when the electric field is removed. Whereas, if a mixture of nematic and chloesteric liquid crystal materials are utilized, the resultant electrooptical element containing the same will provide a visual image display upon application of an electric field and the image display will remain visible for a period of time after removal of the electric field.

A variety of liquid crystal materials are known in the art and accordingly extensive discussion thereof its unnecessary. For further detail, a partial listing of various suitable liquid crystal material may be found at pp. 11–13 of Molecular Structure and the Properties of Liquid Crystals by G. W. Grey (1962), hereby incorporated herein by reference thereto. Illustrative of various suitable nematic mesophase liquid crystal materials which have been found especially useful in the present invention include N-(p-methoxybenzylidene)-p-butylaniline; mixtures of butyl p-(p-ethoxy-phenoxy carbonyl)-phenyl carbonate and p-[N-(p - methoxybenzylidene)amino] phenyl acetate; and mixtures of p-[(p-methoxybenzylidene)amino]phenyl acetate.

Illustrative of various suitable mixtures of nematic mesophase and chlorestic mesophase materials are mixtures containing about 90% by weight of N-(p-methoxybenzylidene)-p-butylaniline and about 10% by weight cholesteryl oleyl carbonate; mixtures containing about 65% by weight of p-pentoxycarbonyloxy-N-(p-valeryloxybenzylidene)aniline, about 30 weight percent N-(p-acetoxybenzylidene) - p-methoxycarbonyloxyaniline, and about 5 weight percent of cholesteryl 2-ethylhexanoate.

Various other liquid crystalline compositions useful in the present invention are described in the following U.S. patent applications and are included herein by reference thereto: Bucher, "Liquid Crystal Compositions," U.S. Ser. No. 218,243, filed Jan. 17, 1972, now abandoned; Van Meter and Klanderman, "Liquid Crystal Compositions I," U.S. Ser. No. 247,564, filed Apr. 26, 1972, now abandoned; Van Meter and Klanderman, "Liquid Crystal Compositions II," U.S. Ser. No. 247,563, filed Apr. 26, 1972; and Klanderman and Criswell, "Liquid Crystalline Compositions and Methods," U.S. Ser. No. 268,265, filed July 3, 1972, now abandoned.

The liquid crystal film composition utilized in the present invention typically has a film thickness on the order of about 2 to about 250 microns. The liquid crystal film, as indicated hereinbefore, is contiguous to the barrier layer in the photoconductive-liquid electrooptical element of the invention. In a conventional electrooptical cell wherein the photoconductive-barrier layer-liquid crystal layers are sandwiched between two parallel transparent electrodes, the liquid crystal film is typically supported by capillary action between the barrier layer and the interior face of the adjacent transparent electrode.

The photoconductive insulating layer used in the present invention may generally be composed of any of the insulating photoconductive layers utilized in electrophotography. Typically these layers have a dry thickness on the order of from about 1 to about 500 microns, preferably 1 to about 50 microns.

Thus, for example, the photoconductors can be inorganic, organic (including both polymeric and non-polymeric types), or organo-metallic compounds. Useful inorganic photoconductors include zinc oxide, zinc sulfide, titanium dioxide, cadmium sulfide, cadmium selenide, lead oxide, and the like. Useful organo-metallic photoconductors include derivatives of Group IIIa, IVa, and Va metals having at least one aminoaryl group attached to the metal atom. Among the various photoconductors which may be used the arylamines such as described in U.S. 3,240,597 issued Mar. 15, 1966, Klupfel et al., U.S. Pat. No. 3,180,730 issued Apr. 27, 1965, and Brantly et al., U.S. 3,567,450 issued Mar. 2, 1971; polyarylalkanes described in Noe et al., U.S. 3,274,000 issued Sept. 20, 1966, Wilson U.S. 3,542,547 issued Nov. 24, 1970, and Seus et al., U.S. 3,542,544 issued Nov. 24, 1970; as well as any of the photoconductors disclosed in Contois and Merrill Belgian Pat. No. 748,511, dated June 15, 1970, are especially preferred. A wide variety of polymeric resins are known for use as binders in the photoconductive layers employing organic photoconductors; examples of such binders including silicone resins, acrylic resins, polycarbonate resins, polyester resins, phenolic resins, and mixtures thereof. Similarly, polymeric photoconductors such as a poly(vinyl carbazole) and halogenated poly(vinyl carbazole) can also be used. As is well known in the art, various photosensitizing agents can also be incorporated in the photoconductive layer to effect a change in the sensitivity or speed of the system or a change in its spectral response characteristics. Examples of particularly effective photosensitizing agents include the pyrylium dyes, such as pyrylium and thiapyrylium dye salts described in U.S. Pat. 3,250,615 issued May 10, 1966 and U.S. 3,615,414 issued Oct. 26, 1971. Particularly useful organic photoconductive compositions useful in the invention are those including a co-crystalline complex of a poly(carbonate) resin and a pyrylium dye as described in U.S. 3,615,414 and U.S. 3,615,418, both issued Oct. 26, 1971, and U.S. 3,679,407, issued July 25, 1972.

The choice of a particular photoconductive composition will depend, in part, on whether the resultant electrooptical element is to be used in the "reflection mode" or "transmission mode" as explained hereinafter. As will be apparent from the following description, if the element is to be used in the "transmission mode" a transparent photoconductive layer and barrier layer are used. On the other hand, if the element is used in the reflection mode, the photoconductive layer may be transparent or opaque.

If the electrooptical element is to be used in the reflection mode the barrier layer preferably contains a suitable amount of colorant material such as a dye or pigment, for example, a nigrosine dye, so that light impinging on the barrier layer through the liquid crystal film is absorbed or reflected, rather than being transmitted through the barrier layer to the photoconductive layer.

The transparent electrodes utilized in the present invention as a means for applying an electric field to the electrooptical element of the invention may be prepared from a wide variety of materials. For example, a conductive glass such as Nesa glass may be utilized; or, a transparent conductive stripe such as a thin layer of indium oxide or other similar material may be coated on the inner surface of a transparent material such as a glass plate or a transparent sheet or plate of a material or synthetic resin.

As indicated herinabove, the electrooptical element of the present invention may be utilized in a suitable electrooptical cell either in a transmission mode or reflection mode of operation. Briefly, these various modes of operation will be illustrated with reference to FIG. 1. For example, when utilized in a transmission mode of operation, an electrooptical element of the present invention comprised of photoconductive layer 7, barrier layer 8, and liquid crystal film 9 is sandwiched between a pair of transparent electrodes 10 and 11. A voltage source 15 is connected to electrodes 10 and 11. For the sake of the present illustration, it will be assumed that electrooptical device 4 contains a liquid crystal material comprised of a mixture of a nematic mesophase and cholesteric mesophase material so that the device exhibits image storage capabilities. An image may be produced in such an electrooptical device by applying a D.C. or low frequency A.C. signal across electrodes 10 and 11 and either simultaneous therewith or subsequent thereto while maintaining the applied potential, exposing photoconductive layer 7 to an electromagnetic radiation pattern 3. The electromagnetic radiation utilized is, of course, radiation to which the photoconductive layer is sensitive. As a result, a conductivity pattern will be established in photoconductive layer 7 which, in turn, will cause an imagewise current flow through device 4 corresponding to the conductivity pattern established in photoconductive layer 7. The imagewise current flow causes dynamic scattering in liquid crystal film 9 causing the liquid crystal material to be converted from a substantially transparent state to a milky or diffuse appearance. The dynamic scatter set up in the liquid crystal film will have a varying intensity in accord with the imagewise current flow set up in the device 4. Having estabilshed imagewise scattering in the liquid crystal material, the applied potential may be removed. Since the element under consideration contains a liquid crystal mateiral exhibiting optical storage properties, the imagewise scattering pattern set up in the liquid crystal material will remain in the liquid crystal film even after the potential is removed. Once the potential is removed, of course, the photoconductive layer 7 becomes insensitive to electromagnetic radiation. Thus, the element may now be used in a transmission mode by projecting visible light through device 4. Since each of the layers of the element of device 4 must be at least to some extent transparent if the element is to be used in a transmission mode, an observer viewing liquid crystal layer 9 of the device will see visible light being transmitted through the device in accord with the image pattern established in liquid crystal layer 9. In general, the visible image pattern seen by the observer may be thought of as a negative contrast image of the original image pattern.

If an electrooptical element of the present invention is utilized in a device such as illustrated in FIG. 1 and operated in a reflective mode, an image pattern will be produced in liquid crystal layer 9 essentially as described hereinabove wherein the element was operated in a transmission mode. However, in the reflection mode of operation, barrier layer 8 rather than being a transparent material will be substantially opaque or otherwise incapable of transmitting visible light. Moreover, when device 4 is operated in the reflection mode, photoconductive layer 7 need not be transparent to visible light radiation. Accordingly, in the reflection mode of operation, after an imagewise dynamic scatter pattern has been established in liquid crystal layer 9, the potential applied to the device may be removed. The element with the stored image pattern contained in layer 9 will then be subjected to a uniform exposure of visible light from the front through transparent electrode 10. The visible light thus projected through layer 10 will be transmitted through the liquid crystal layer 9 in accordance with the image pattern established in this layer. In those areas of layer 9 which remain substantially transparent, i.e., those areas of layer 9 where the liquid crystal material has not been placed into a scattering mode, visible light will be transmitted, and an observer looking at layer 9 will see in these areas the surface of the opaque barrier layer 8. In those areas of layer 9 wherein the liquid crystal material has been placed in a scattering mode, visible light impinging thereon will be scattered back to the observer who will see these areas as essentially white or grey areas depending upon the degree of scattering therein. Generally, in a reflection mode of operation, an observer viewing liquid crystal layer 9 will see what may be thought of as a contrast positive image of the original image pattern projected onto device 4.

The practice of the invention will be further evidenced by the examples listed below, which are designed to be illustrative rather than offering undue limitations in scope.

EXAMPLE 1

A 10-micron-thick (dry thickness) photoconductive layer is prepared composed of polycarbonate resin, 4,4′-diethylamino-2,2′-dimethyltriphenylmethane organic photoconductor and a thiapyrylium sensitizing dye. The support for the layer is 4-mil poly(ethylene terephthalate) which is vacum-deposited with nickel to provide a conducting support. The resultant organic photoconductive film is used in each of the examples.

A control barrier layer (5 microns dry thickness) of cellulose nitrate is coated over the above-described organic photoconductor film. The coating solution consists of the following:

| | G. |
|---|---|
| Parlodion (trademark of Mallinckrodt chemical Works for Cellulose Nitrate) | 120 |
| Methanol | 1320 |
| n-Butanol | 560 |
| 2-methoxyethanol | 100 |

This barrier layer is similar to that disclosed in Morse, U.S. Ser. No. 81,959, differing only in thickness of the layer. A liquid crystal film is then coated on the surface of the cellulose nitrate barrier layer. The composition of the liquid crystal film is set forth hereinafter.

The resultant element is test for both shelf-life stability and imaging capabilities. Details and tabulated results follow the examples. Shelf-life stability is good. However, the resultant scattered light images are of low quality and a display cell containing the photoconductor-barrier layer-liquid crystal element of this example exhibits poor electricaly response (i.e., undesirably high-voltage pulses and long pulse times are required for image formation).

EXAMPLE 2

A photoconductor-barrier layer-liquid crystal-containing element similar to Example 1 is prepared, except that the control cellulose nitrate barrier layer is 3 microns thick. The element has good shelf stability and produces good images, but exhibits poor electrical response.

EXAMPLE 3

A photoconductor-barrier layer-liquid crystal-containing element is prepared similar to Example 1, except that the control cellulose nitrate barrier is 1.5 microns thick. This element has good shelf stability and produces good quality images, but does not exhibit good electrical response.

EXAMPLE 4

Adhesion-promoting layer

A separate adhesion-promoting subbing layer consisting of 60% poly(acrylic acid) and 40% poly(vinyl acetate) is coated on the organic photoconductor film described in Example 1 at 0.025 g./ft.$^2$ from a 3% methanol solution. The resultant adhesion-promoting layer has a dry thickness of about 0.2 micron. This serves as a base layer for the examples that follow. The adhesion-promoting layer is optional and is not a good barrier layer itself because of its liquid cystal-solvating properties.

EXAMPLE 5

A 2-micron-thick coating (dry thickness) of a medium-molecular-weight poly(vinyl alcohol) (99% hydrolyzed, purchased from E. I. du Pont de Nemours & Co. under the name of Elvanol 71–30) is applied from a 3% aqueous solution on the composite film structure (photoconductor plus adhesive layer) described in Example 4. A liquid crystal film is then coated on the surface of the above-described poly(vinyl alcohol) coating to form a photoconductor-barrier layer-liquid crystal element of the invention. The resultant element has good shelf-life stability; image quality is excellent and the element has very good electrical response. See Tables 1 and 2.

EXAMPLE 6

This example is similar to Example 5, except that a high-molecular-weight poly(vinyl alcohol) (87–89% hydrolyzed, purchased from E. I. du Pont de Nemours & Co. under the trade name of Elvanol 50–42) is coated on the composite film structure described in Example 4. A liquid crystal film is then coated on the surface of the above-described poly(vinyl alcohol) coating to form a photoconductor-barrier layer-liquid crystal element of the invention. The resultant element has good shelf-life stability; image quality is excellent and electrical response is very good. See Tables 1 and 2.

EXAMPLE 7

This example is similar to Example 6, except that the poly(vinyl alcohol) is crosslinked with poly(silicic acid) as it is coated on the composite film structure described in Example 4. The coating solution contains 200 ml. of a 3-weight-percent aqueous solution of Elvanol 50-42, 160 ml. of a methanol-water mixture containing equal parts by weight of methanol and water, 5 ml. of 1 N HCl and 40 ml. of a poly(silicic acid) solution. The poly(silicic acid) solution is prepared by mixing 100 parts by weight of tetraethyl orthosilicate with 70 parts by weight of ethyl alcohol and 22 parts of a 0.1 N MCl solution. The resultant dry crosslinked coating is comprised of about equal parts by weight of poly(vinyl alcohol) and poly(silicic acid). A liquid crystal film is then coated on the surface of the above-described crosslinked poly(vinyl alcohol) coating to form a photoconductor-barrier layer-liquid crystal element of the invention. The resultant element has good shelf-life stability; image quality is excellent and the electrical response is very good. See Tables 1 and 2.

Shelf-life tests

The evaluation for chemical stability (shelf lifetime) for Examples 1–3 and 5–7 consists of maintaining the photoconductor-barrier layer structure in direct contact with the liquid crystal material at room temperature (23° C.) for a specified period. At the termination of this period, the samples are visually examined for chemically caused defects. To eliminate environmental contamination, the samples are protected with microscope-slide-cover glass. Comparative data for two liquid crystal materials are tested with the elements of Examples 1–3 and 5–7. Data are given for the following liquid-crystal storage mixtures:

Storage Mix I—comprises 90% by weight N-(p-methoxybenzylidene)-p-butylaniline and 10% by weight cholesteryl oleyl carbonate.

Storage Mix II—comprises an interconverted mixture of 66.6 mole percent N - (p - valeryloxybenzylidene)-p-pentyloxycarbonyloxyaniline and 33.3 mole percent N-p-acetoxybenzylidene) - p-methoxycarbonyloxyaniline, and small amounts of a cholesteryl ester and a quaternary salt comprising a quinolinium system with a long alkyl chain on the nitrogen. Such interconverted liquid crystal mixtures are described in U.S. Ser. No. 268,265 filed July 3, 1972, referred to earlier herein.

In general, the shelf lifetimes are greatly extended by the use of Storage Mix II, whereas with Storage Mix I only the thickest cellulose nitrate barrier coat has an appreciable lifetime. The results of the above-described shelf-lifetime tests are shown for Examples 1–3 and 5–7 in Table 1.

In addition, shelf-lifetime tests (not shown in Table 1) for Storage Mixture II at 50° C. for 4 weeks have shown no visible damage to the photoconductor element coated with poly(vinyl alcohol) or silicate crosslinked poly(vinyl alcohol) (Examples 5, 6 and 7) barrier layers. Photoconductor elements coated with cellulose nitrate barrier layers (similar to those of Examples 1–3) are destroyed after 5 days.

Image and electrical-response tests

The imaging capabilities of the materials described in Examples 1–3 and 5–7 are evaluated in a display device comprising a liquid crystal storage mixture sandwiched between conducting glass and the barrier-coated organic photoconductor elements of Examples 1–3 and 5–7. With a voltage pulse applied across the structure, photocurrent causes imagewise dynamic scatter in the liquid crystal storage mixture. Liquid crystal Storage Mixture II is used for these studies. The cell area is 2 x 2 inches with a liquid crystal thickness of 12.7 microns. The photoconductor is illuminated with a 150-watt continuous xenon source providing $9 \times 10^3$ ergs./cm.$^2$-sec. of incident radiant energy. A line-copy positive transparency is used for imaging. Table II summarizes the electrical response parameters which provide a qualitative index of cell performance.

TABLE I.—SHELF LIFETIME TEST RESULTS

| Example | Storage mix I Test duration | Storage mix I Rating | Storage mix II Test duration | Storage mix II Rating |
|---|---|---|---|---|
| 1 (control) | 33 days | A | 170 days | A |
| 2 (control) | do | B | do | A |
| 3 (control) | do | C | do | A |
| 5 | 14 days | C | 170 days | A |
| 6 | do | B | do | A |
| 7 | do | B | do | A |
| Organic photoconductive film with liquid crystal film and no barrier layer (control). | 1 day | C | 60 days | B |

Rating code:
A = Zero defects,
B = Minor damage,
C = Total destruction.

TABLE II.—PC/LC Cell Performance

| Example | Pulse amplitude, volts | Pulse duration, seconds | Image quality [1] |
|---|---|---|---|
| 1 (control) | 450 | [2] 5.0 | 5 |
| 2 (control) | 450 | [2] 9.0 | 2 |
| 3 (control) | 450 | [2] 2.0 | 1 |
| 5 | 280 | 0.8 | 1 |
| 6 | 300 | [2] 2.0 | 1 |
| 7 | 300 | 0.6 | 1 |
| Organic photoconductive film with liquid crystal film and no barrier layer (control). | 200 | 0.4 | 1 |

[1] Image quality rated 1 to 5; 1 is excellent; 5 is poor.
[2] Manually simulated pulse conditions.

The invention has been described in detail with particular reference to preferred embodiments thereof but it will be understood that variations and modifications can be effected within the spirit and scope of the invention.

We claim:

1. In an electrooptical element comprised of a film of a liquid crystal composition, a layer of a photoconductive insulating composition, a barrier layer separating such film from such composition, the improvement wherein said barrier layer comprises a polymeric composition essentially of about 50 to 100 weight percent poly(vinyl alcohol) and 0 to about 50 weight percent of a crosslinking agent for said poly(vinyl alcohol), said barrier layer having an electrical resistivity greater than that of said liquid crystal composition and less than the dark resistivity of said photoconductive insulating composition.

2. The invention of claim 1 wherein said barrier layer has a dry thickness within the range of from about 0.5 to about 5 microns.

3. The invention of claim 1 wherein said polymeric composition consists essentially of about 50 to 100 percent by weight poly(vinyl alcohol) and from 0 to about 50 weight percent by weight hydrolyzed tetraethyl orthosilicate.

4. The invention of claim 1 wherein said polymeric composition consists essentially of poly(vinyl alcohol).

5. The invention of claim 1 wherein said barrier layer has a specific resistivity greater than about $10^{10}$ ohm-cm. and less than about $10^{15}$ ohm-cm.

6. The invention of claim 1 wherein said barrier layer comprises a colorant in an amount effective to render said barrier layer opaque to visible light.

7. An electrooptical element comprising a film of a liquid crystal composition, a layer of an organic photoconductive insulating composition, and a barrier layer separating such film from such composition, said barrier layer having a dry thickness within the range of from about 0.5 to about 5 microns, an electrical resistivity greater than about $10^{10}$ ohm-cm. and less than about $10^{15}$ ohm-cm., and comprising a polymeric composition consisting essentially of about 50 to 100 weight percent of poly(vinyl alcohol) and from 0 to about 50 weight percent hydrolyzed tetraethyl orthosilicate.

8. The invention of claim 7 wherein said liquid crystal composition comprises an interconverted mixture of N-(p-valeryloxybenzylidene) - p - pentyloxycarbonyloxyaniline and N-(p-acetoxybenzylidene)-p-methoxy-carbonyloxyaniline.

9. The invention of claim 7 wherein said liquid crystal composition comprises a mixture of a nematic mesophase material and a cholesteric mesophase material.

References Cited
UNITED STATES PATENTS

| | | | |
|---|---|---|---|
| 3,592,527 | 7/1971 | Connors et al. | 350—160 LC |
| 3,647,280 | 3/1972 | Klein et al. | 350—160 LC |
| 3,652,148 | 3/1972 | Wysochi et al. | 350—160 LC X |
| 3,671,231 | 6/1972 | Haas et al. | 96—1 R |
| 3,687,515 | 8/1972 | Haas et al. | 350—160 LC X |
| 3,707,322 | 12/1972 | Wysochi et al. | 96—1 X |
| 3,728,008 | 4/1973 | Allan et al. | 350—160 LC |
| 3,634,079 | 1/1972 | Champ et al. | 96—1.5 |
| 3,639,122 | 2/1972 | Shimiger et al. | 96—1.5 X |
| 3,745,005 | 7/1973 | Yaeger et al. | 96—1.5 |
| 3,722,998 | 3/1973 | Morse | 96—44 X |

NORMAN G. TORCHIN, Primary Examiner

J. R. MILLER, Assistant Examiner

U.S. Cl. X.R.

96—1 R; 117—218; 250—213; 350—160 LC, 312

UNITED STATES PATENT OFFICE
CERTIFICATE OF CORRECTION

Patent No. 3,795,516  Dated March 5, 1974

Inventor(s) Richard W. Stahr and Hans G. Franke

It is certified that error appears in the above-identified patent and that said Letters Patent are hereby corrected as shown below:

Column 12, line 44, after "composition" insert --consisting--.

Signed and sealed this 10th day of September 1974.

(SEAL)
Attest:

McCOY M. GIBSON, JR.
Attesting Officer

C. MARSHALL DANN
Commissioner of Patents